United States Patent
Fee et al.

(10) Patent No.: US 10,013,278 B2
(45) Date of Patent: Jul. 3, 2018

(54) METHODS AND SYSTEMS FOR BATCH PROCESSING IN AN ON-DEMAND SERVICE ENVIRONMENT

(71) Applicant: salesforce.com, inc., San Francisco, CA (US)

(72) Inventors: Gregory D. Fee, Seattle, WA (US); William J. Gallager, Easton, PA (US)

(73) Assignee: salesforce.com, inc., San Francisco, CA (US)

( * ) Notice: Subject to any disclaimer, the term of this patent is extended or adjusted under 35 U.S.C. 154(b) by 163 days.

(21) Appl. No.: 14/288,324

(22) Filed: May 27, 2014

(65) Prior Publication Data
US 2014/0282556 A1 Sep. 18, 2014

Related U.S. Application Data

(60) Continuation of application No. 13/620,147, filed on Sep. 14, 2012, now Pat. No. 8,776,064, which is a continuation of application No. 13/076,794, filed on Mar. 31, 2011, now Pat. No. 8,584,124, application No. 14/288,324, filed on May 27, 2014, which is a continuation of application No. 14/061,545, filed on Oct. 23, 2013, which is a division of application No. 13/076,794, filed on Mar. 31, 2011, now Pat. No. 8,584,124.

(60) Provisional application No. 61/325,967, filed on Apr. 20, 2010.

(51) Int. Cl.
*G06F 9/46* (2006.01)
*G06F 9/48* (2006.01)

(52) U.S. Cl.
CPC ............ *G06F 9/466* (2013.01); *G06F 9/4843* (2013.01); *G06F 2209/5013* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

*Primary Examiner* — Kenneth Tang
(74) *Attorney, Agent, or Firm* — Meyertons, Hood, Kivlin, Kowert & Goetzel, P.C.

(57) ABSTRACT

In accordance with embodiments disclosed herein, there are provided mechanisms and methods for batch processing in an on-demand service environment. For example, in one embodiment, mechanisms include receiving a processing request for a multi-tenant database, in which the processing request specifies processing logic and a processing target group within the multi-tenant database. Such an embodiment further includes dividing or chunking the processing target group into a plurality of processing target sub-groups, queuing the processing request with a batch processing queue for the multi-tenant database among a plurality of previously queued processing requests, and releasing each of the plurality of processing target sub-groups for processing in the multi-tenant database via the processing logic at one or more times specified by the batch processing queue.

20 Claims, 5 Drawing Sheets

(56) References Cited

U.S. PATENT DOCUMENTS

| | | | |
|---|---|---|---|
| 5,821,937 A | 10/1998 | Tonelli et al. | |
| 5,831,610 A | 11/1998 | Tonelli et al. | |
| 5,873,096 A | 2/1999 | Lim et al. | |
| 5,878,215 A * | 3/1999 | Kling | G06Q 20/00 370/282 |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,563 B1 * | 3/2004 | Koskas | G06F 17/30324 707/600 |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,742,015 B1 * | 5/2004 | Bowman-Amuah | G06F 8/20 709/223 |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,657,537 B1 * | 2/2010 | Corbett | G06F 3/0614 707/643 |
| 7,680,848 B2 | 3/2010 | Janedittakarn et al. | |
| 7,698,160 B2 | 4/2010 | Beaven et al. | |
| 7,779,039 B2 | 8/2010 | Weissman et al. | |
| 8,015,495 B2 | 9/2011 | Achacoso et al. | |
| 8,082,301 B2 | 12/2011 | Ahlgren et al. | |
| 8,090,974 B1 * | 1/2012 | Jain | H04L 41/5025 714/21 |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,522,248 B1 * | 8/2013 | Nair | G06F 9/5027 718/104 |
| 8,776,064 B2 * | 7/2014 | Fee | G06F 9/4843 707/703 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0078117 A1 * | 6/2002 | Wang Baldonado | G06F 9/5055 718/101 |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0223022 A1 | 10/2005 | Weissman | |
| 2006/0021019 A1 | 1/2006 | Hinton et al. | |
| 2008/0082586 A1 | 4/2008 | Jasik et al. | |
| 2008/0249972 A1 | 10/2008 | Dillon | |
| 2009/0030906 A1 * | 1/2009 | Doshi | G06F 17/30575 |
| 2009/0049053 A1 | 2/2009 | Barker et al. | |

(56) References Cited

U.S. PATENT DOCUMENTS

| 2009/0063415 A1 | 3/2009 | Chatfield et al. |
| 2009/0177744 A1 | 7/2009 | Marlow et al. |
| 2009/0178042 A1* | 7/2009 | Mehta ............... G06F 9/4881 718/101 |

* cited by examiner

METHODS AND SYSTEMS FOR BATCH PROCESSING IN AN ON-DEMAND SERVICE ENVIRONMENT

CLAIM OF PRIORITY

This application is a continuation of U.S. application Ser. No. 13/620,147, filed Sep. 14, 2012, which is a continuation of U.S. application Ser. No. 13/076,794, filed Mar. 31, 2011, which claims priority to the provisional utility application entitled "METHODS AND SYSTEMS FOR BATCH PROCESSING IN AN ON-DEMAND SERVICE ENVIRONMENT," filed on Apr. 20, 2010, having an application number of 61/325,967, the entire contents of which are incorporated herein by reference. This application is also a continuation of U.S. application Ser. No. 14/061,545, filed Oct. 23, 2013, which is a divisional of U.S. application Ser. No. 13/076,794, filed Mar. 31, 2011, which claims priority to U.S. Provisional Application No. 61/325,967, filed Apr. 20, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to methods and systems for batch processing in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

In a conventional client/server transaction a client computing device submits a request to a server, the server processes the request, and then returns a result to the client, thus completing the transaction cycle. While such a model works well for simple transactions that process quickly, the above model does not scale well to transactions that require longer durations to process. One problem is that a client device awaiting a response from a server may appear to have "hung" or "crashed" while awaiting the response, or may simply time out, before a response is received, thus having wasted the period of time awaiting a server response, and potentially having caused a server to waste resources developing a response that is never received by the client.

Although a result from the server may eventually be forthcoming, a client experiencing a perceived delay may terminate prematurely and potentially re-submit the request, causing duplicative effort on the part of the server and potentially introducing transactional errors, such as having the server implement the same request multiple times. Further still, client requests, such as those involving database transactions, have the potential to corrupt data or place records into an unknown state if a request is successfully processed by a database, but a successful completion message cannot be communicated to the client due to a prematurely terminated session or session timeout.

Such a problem is exacerbated where a client device is attempting to request a large transaction or initiate a large number of smaller transactions with a database which require more time for processing than may be acceptable to a client awaiting a result. Such large transactions or large numbers of small transactions are computationally intensive and can overburden or overwhelm supporting architecture in situations where a result or response must be returned quickly. Additionally, where supporting architecture is shared by multiple entities, dedicating a large share of processing resources to complete a request on behalf of one entity may degrade performance for all other entities sharing the supporting architecture.

The present state of the art may therefore benefit from the methods and systems for batch processing in an on-demand service environment as described herein.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
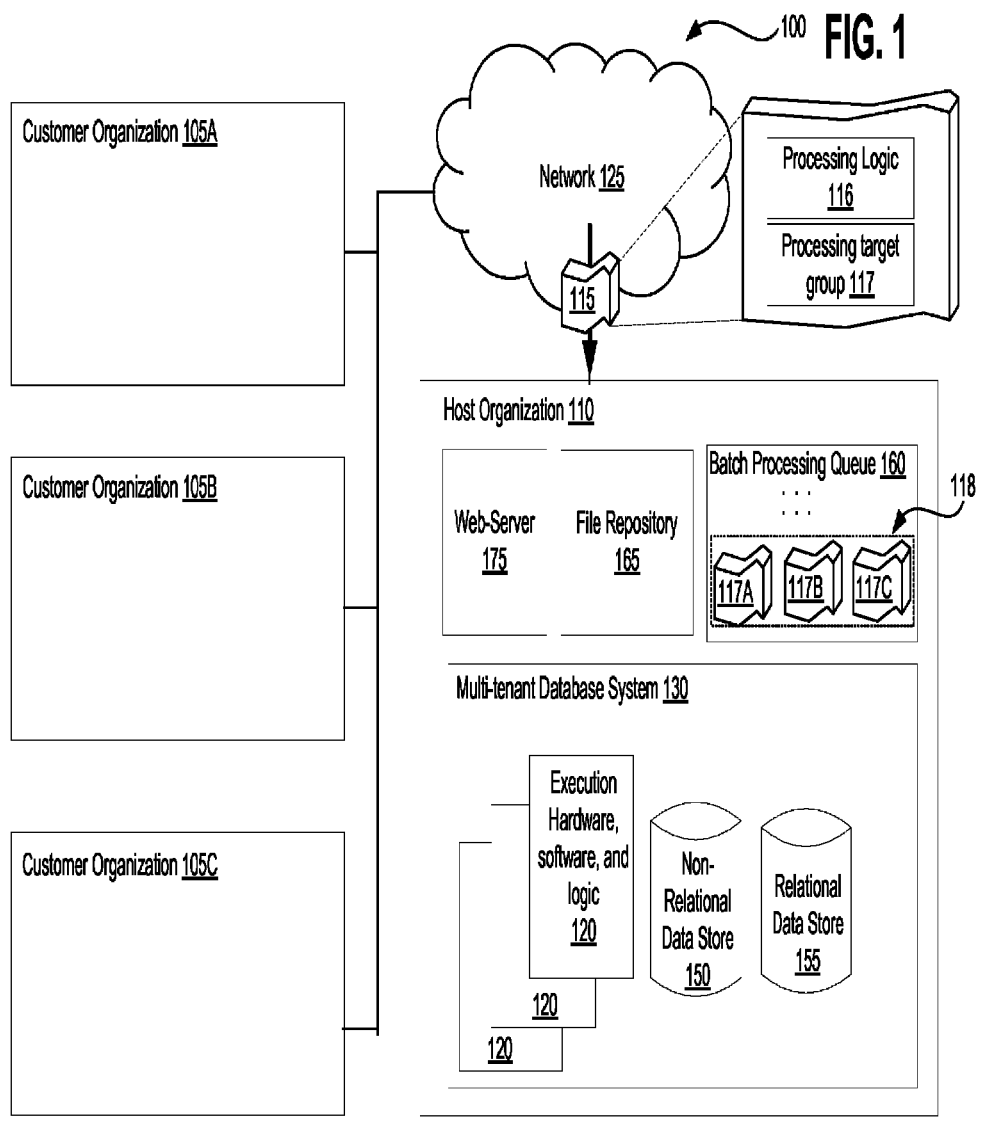
FIG. 1 depicts an exemplary architectural overview of the environment in which embodiments may operate.

Described herein are systems, devices, and methods for batch processing in an on-demand service environment, for example, mechanisms to receiving, queuing, and releasing work associated with incoming processing requests.

In a particular embodiment, such mechanisms include receiving a processing request for a multi-tenant database, in which the processing request specifies processing logic and a processing target group within the multi-tenant database. Such an embodiment further includes dividing or chunking the processing target group into a plurality of processing target sub-groups, queuing the processing request with a batch processing queue for the multi-tenant database among a plurality of previously queued processing requests, and releasing each of the plurality of processing target sub-groups for processing in the multi-tenant database via the processing logic at one or more times specified by the batch processing queue.

For example, in an on-demand service environment, such as a "cloud computing" environment where a host organization provides computing resources and services to customer organizations, customer organizations may transact with the host organization by way of a client request and a server response cycle. In such a cycle, the client sends a request, and awaits a response from the server before proceeding to another task. For example, the client may submit a database transaction, such as a record add, a record retrieval, a record update, a record search, and so forth, and simply await the response from the server. This type of transaction cycle, where the client device awaits a response from the server is sometimes referred to as synchronous processing.

However, customer organizations utilizing such services may find it advantageous to submit large transactions (e.g., such as the generation of a year end report) or a large number of individual transactions with one request (such as a batch of transactions) to the host organization for processing, thus making the synchronous client/server request/response model undesirable.

Various problems arise where a customer organization attempts to submit such requests when using synchronous processing. For example, such a request may exceed a time-out period of the client. Additionally, where a host organization provides parallel processing so that transactions are fulfilled more quickly, there is a potential for a single customer organization to submit a large request, or such a large number of concurrent transaction requests, that, when parallelized by the host organization, the processing dedicated to the originating customer organization consumes an inordinate amount of resources within the host organization, thus causing delays and detrimental effects for other customer organizations utilizing the same on-demand services.

In one embodiment, requests that exceed a period of actual or estimated processing time for the multi-tenant database are either rejected, or prematurely terminated by the host organization. In accordance with such embodiments, the host organization may respond to an originating customer organization (e.g., within time constraints for a synchronous request/reply session to a client device of the customer organization) with an error message or information message indicating that the request is too large, or too computationally intensive to be processed synchronously. Where such requests are rejected or prematurely terminated, the host organization may further indicate to the originating client device of the host organization that the request may be re-submitted as a batch request via a batch request interface.

Utilizing the systems and methods described herein, batch processing requests may be submitted by customer organizations to the host organization in a format that is convenient for the customer organizations and processed asynchronously, in a manner that best utilizes the available computational resources of the host organization, without detrimentally affecting other users of the same on-demand services provided by the host organization. With asynchronous processing, the client submits an asynchronous request, such as a batch processing request, and receives, for example, an acknowledgement of the submission, but completion of the work is not communicated to originating client until a later time, thus making the transaction asynchronous or non-synchronous.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments of are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 illustrates an exemplary architecture 100 in which embodiments may operate. Architecture 100 depicts a host organization 110 communicably interfaced with several customer organizations (105A, 105B, and 105C) via network 125. Within the host organization 110 is a web-server 175, file repository 165, batch processing queue 160, and a multi-tenant database system 130 having a plurality of underlying hardware, software, and logic elements 120 therein that implement database functionality and a code execution environment within the host organization 110. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services or cloud computing services to subscribing customer organizations 105A-C.

In one embodiment, the host organization 110 receives a processing request 115 for the multi-tenant database 130 (e.g., a request for processing via the multi-tenant database 130). In such an embodiment, the processing request 115 specifies processing logic 116 and a processing target group 117 within the multi-tenant database 130. In accordance with one embodiment, the processing request 115 specifies batch processing. For example, a header of the processing request 115 may indicate batch processing, or asynchronous processing, or a parameter or flag may be set within the processing request 115 indicating the workload associated with the processing request 115 is to be conducted by the host organization via batch processing. In an alternative embodiment, the processing request 115 is received via a batch processing interface, or a batch job submission interface, and processing requests 115 submitted and/or received via such an interface are defaulted to batch processing within the host organization 110.

In one embodiment, batch processing requests are received at, or submitted to, a web-server 175 within host organization 110. Host organization 110 may receive a variety of requests, including batch processing requests 115 for asynchronous processing from one or more of the plurality of customer organizations 105A-105C via the network 125. Incoming requests received at web-server 175 may specify a request for services from the host organization 110, such as a real-time transaction request for synchronous processing to retrieve or store data on behalf of one of the customer organizations 105A-C or processing requests 115 specifying a batch processing request for asynchronous processing. Web-server 175 may be responsible for receiving batch processing requests 115 from various customer organizations 105A-C via network 125 and provide a web-based interface to an end-user client machine originating such batch processing requests 115, for example, a client computing device at or operating within customer organization 105A-C.

In one embodiment, the host organization 110 having the multi-tenant database 130 operating therein receives the processing request 115 from a customer organization 105A-C. In such an embodiment, the processing request 115 received at the host organization 110 is one of a plurality of requests received from a plurality of customer organizations 105A-C, in which each of the plurality of customer organizations 105A-C is an entity selected from the following group: a separate and distinct remote organization, an organizational group within the host organization, a business partner of the host organization, or a customer organization that subscribes to cloud computing services provided by the host organization 110.

Thus, each of the separate and distinct customer organizations (105A-105C) may be remotely located from the host organization 110 that provides on-demand services to the customer organizations (105A-105C) via multi-tenant database system 130 executing therein. Alternatively, one or more of the customer organizations 105A-105C may be co-located with the host organization 110, such as within the same organization that hosts and provides the multi-tenant database system 130 upon which underlying data is persistently stored, such as data to be utilized in fulfillment of the processing request 115 submitted to the host organization 110 from a customer organization 105A-C. In one embodiment, the underlying data persistently stored upon the multi-tenant database 130 corresponds to the information or data targeted by the specified processing target group 117. Where the customer organizations 105A-C are remote, host organization 110 provides remotely implemented cloud computing services.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host organization 110.

In one embodiment, the host organization 110, responsive to receiving processing requests 115, divides the processing target group 117 specified by the processing request 115 into a plurality of processing target sub-groups 117A, 117B, and 117C.

In one embodiment, dividing the processing target group 117 into a plurality of processing target sub-groups 117A, 117B, and 117C further includes the host organization 110 determining a total size of the processing target group 117, and dividing the processing target group 117 into the plurality of processing target sub-groups 117A, 117B, and 117C based on a size threshold. In such an embodiment, the plurality of processing target sub-groups 117A, 117B, and 117C do not overlap and when taken together, in the aggregate, the plurality of processing target sub-groups 117A, 117B, and 117C correspond in size to the determined total size.

The determined total size of the processing target group 117 may be based on a variety of criterion. In accordance with one embodiment, the total size of the processing target group 117 corresponds to a criterion selected from the following group: a total number of records in the multi-tenant database 130 to be processed in accordance with the processing request 115; a total number of rows in the multi-tenant database 130 to be processed in accordance with the processing request 115; a total number of objects in the multi-tenant database 130 to be processed in accordance with the processing request 115; and a total number of database statements to be transacted against the multi-tenant database 130 in accordance with the processing request 115. Although three processing target sub-groups are depicted by FIG. 1, the resulting number of chunks or processing target sub-groups 117A-C will vary as a function of the size threshold and criterion selection.

The database statements referenced above may be, for example, structured database queries specifying objects in a non-relational data store 150 within the multi-tenant database, structured database queries specifying, for example, one or more tables, columns, and selection criterion from a relational data store 155, or a combination of both.

For example, in accordance with one embodiment, the processing target group 117 within the multi-tenant database 130 as specified by the processing request 115 includes a plurality of rows within one or more tables of a relational data store 155 in the multi-tenant database 130 or a plurality of objects in a non-relational data store 150 in the multi-tenant database 130, or both. In such a way, the processing target group 117 represents the total scope of data to be transacted against by the multi-tenant database system 130 in fulfillment of the processing request 115. Where the processing target group 117 corresponds exclusively to data within the relational data store 155, the processing target group 117 may be considered a total data set to be transacted against. Where the processing target group 117 corresponds exclusively to data within the non-relational data store 150, processing target group 117 may be considered one or more objects managed by the non-relational data store 150, whether such objects are explicitly enumerated or correspond with appropriate selection criteria (e.g., determined pursuant to index searches, etc.).

In accordance with certain embodiments, the multi-tenant database system 130, includes both a relational data store 155 and a non-relational data store 150. In one embodiment, the relational data store 155 includes a relational database implementation selected from the following group: an Oracle compatible database implementation, an IBM DB2 Enterprise Server compatible relational database implementation, a MySQL compatible relational database implementation, and a Microsoft SQL Server compatible relational database implementation. In such an embodiment, the non-relational data store 150 includes a NoSQL non-relational database implementation selected from the following group: a Vampire compatible non-relational database implementation, an Apache Cassandra compatible non-relational database implementation, a BigTable compatible non-relational database implementation, and an HBase compatible non-relational database implementation.

In one embodiment, the size threshold is specified by the customer organization 105A-C having originated/submitted the batch processing request 115 to the host organization 110. In such an embodiment, dividing the processing target group 117 into the plurality of processing target sub-groups 117A-C constitutes chunking, breaking up, or dividing the processing target group 117 into the plurality of processing target sub-groups 117A-C at the host organization 110 based on the size threshold specified by the customer organization 105A-C. In alternative embodiments, the host organization 110 specifies or determines a size threshold and chunks the processing target group 117 into the plurality of processing target sub-groups 117A-C based upon the host organization determined size threshold.

In one embodiment, the host organization 110 queues the processing request 115 with a batch processing queue 160 for the multi-tenant database 130 among a plurality of previously queued processing requests. For example, the processing target sub-groups 117A, 117B, and 117C, also referred to as "chunks," are shown queued within batch processing queue 160, having already been divided up by the host organization. Element 118 represents the queued processing request after having been received as processing request 115 and then queued with the batch processing queue 160. An unknown number of previously queued processing requests are already present within the batch processing queue 160 as represented by the preceding ellipses. Queuing of the asynchronous work load associated with the processing request 115 is described in more detail below with reference to FIG. 2.

In one embodiment, processing logic 116 specified by the processing request 115 includes customer logic to be applied to the processing target group 117 in the multi-tenant database, or customer logic to be applied to the plurality of processing target sub-groups 117A, 117B, and 117C in accordance with the chunking or division described above.

The processing logic 116 or customer logic may be submitted with a processing request 115, for example, as payload data, or alternatively, may be already stored within host organization 110, and specified, selected, or identified by the processing request 115 as the processing logic 116 to be applied to the processing target group 117. For example, the processing logic 116 or customer logic may be stored within file repository 165 of the host organization 110 or may be stored within the multi-tenant database 130 of the host organization. Regardless of how the processing logic is provided or stored, the customer logic 116, in accordance with the described embodiments, is applied to each of the plurality of processing target sub-groups 117A, 117B, and 117C in the multi-tenant database 130 when released by the batch processing queue to the multi-tenant database 130. Thus, while the processing request 115 specifies a processing target group 117, such as a total scope of data, objects, or a dataset to be transacted, which is then broken down or divided into a plurality of processing target sub-groups (e.g., 117A-C), the same customer logic/processing logic 116 will be iteratively processed against each of the individual chunks (processing target sub-groups 117A-C) by the host organization.

Figure 2:
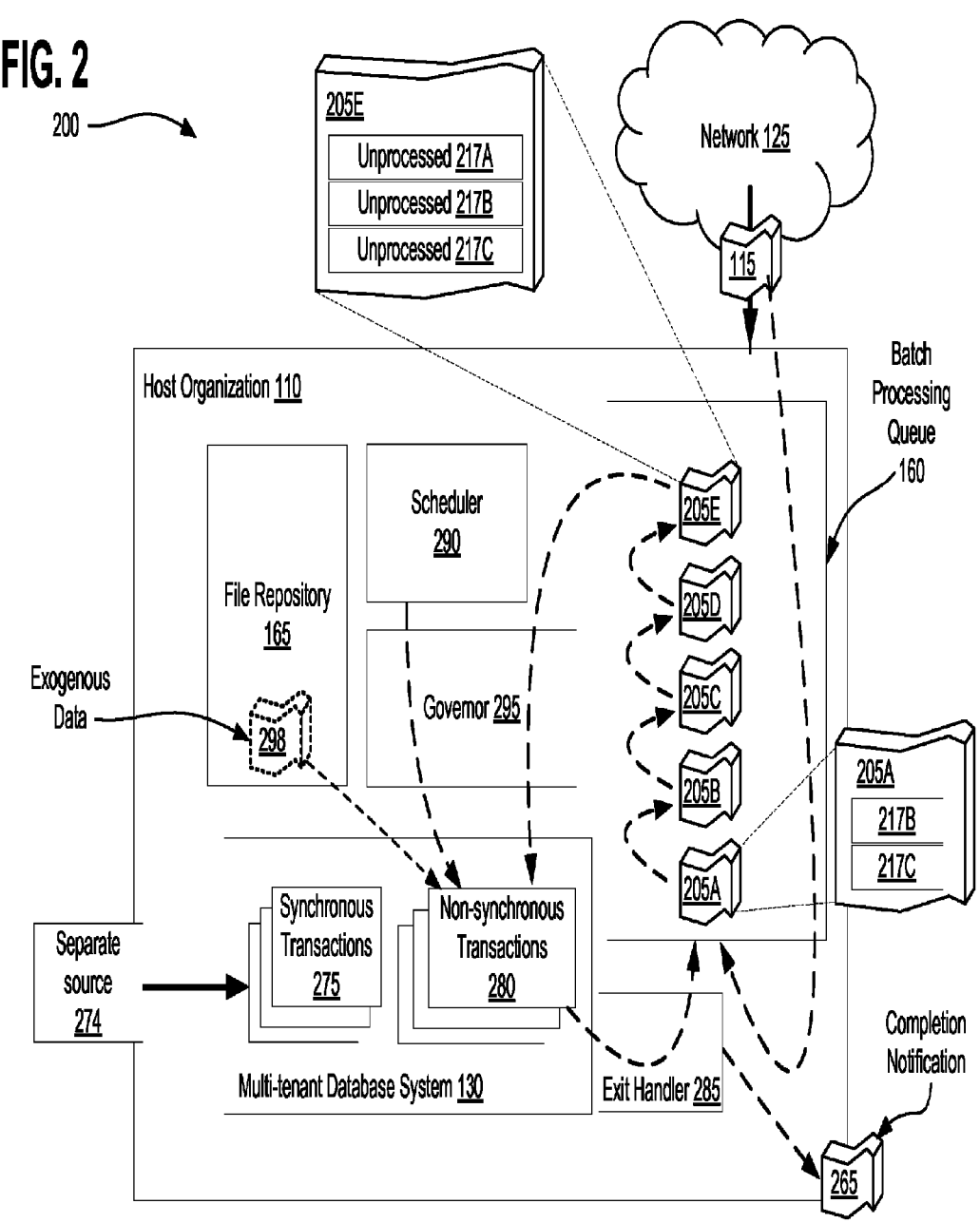
FIG. 2 depicts an alternative exemplary architectural overview of the environment in which embodiments may operate.

FIG. 2 illustrates an alternative exemplary architecture 200 in which embodiments may operate.

In accordance with one embodiment, the host organization 110 releases each of the plurality of processing target sub-groups (e.g., 117A, 117B, and 117C from FIG. 1 or unprocessed chunks 217A, 217B, and 217C from FIG. 2) for processing in the multi-tenant database 130 via the processing logic 116 at one or more times specified by the batch processing queue 160. As each processing target sub-group 217A-C or chunk is released to the multi-tenant database, the processing logic is applied to the processing target sub-group 217A-C as specified by the originally received processing request.

In one embodiment, the processing request 115 specifies a batch processing request and the workload associated with the batch processing request includes a plurality of database transactions to be processed asynchronously in the multi-tenant database 130. In such an embodiment, running each of the plurality of processing target sub-groups 217A-C released for processing into the multi-tenant database 130 includes releasing each of the plurality of processing target sub-groups 217A-C for processing concurrently with, or for processing simultaneously among, a plurality of other database transactions to be processed synchronously in the multi-tenant database 130 (e.g., among synchronous transactions 275). Thus, the multi-tenant database 130 processes both synchronous transactions 275 and non-synchronous transactions 280 simultaneously. The synchronous transactions 275 are presented to the multi-tenant database from a separate source 274, while the asynchronous transactions 280 are presented to the multi-tenant database as they are released by the batch processing queue 160.

In one embodiment, a scheduler 290 additionally presents transactions and workloads to the multi-tenant database 130. The scheduler 290 releases asynchronous processing requests at a specified time, or according to a specified interval or other schedule as specified by a customer organization 105A-C. In one embodiment, work released by the scheduler 290 for processing via the multi-tenant database 130 bypasses the batch processing queue 160 while in other embodiments, work released by the scheduler 290 is added to the queue 160, and then processed at a time specified by the batch processing queue (e.g., when the batch processing queue 160 releases the previously scheduled job released by scheduler 290).

In one embodiment, releasing each of the plurality of processing target sub-groups 217A-C for processing at the one or more times specified by the batch processing queue 160 includes the following operations: waiting until the queued processing request (e.g., one of 205A, 205B, 205C, 205D, and 205E) reaches a top position in the batch processing queue 160 (such as queued processing request 205E presently at the top position of the batch processing queue 160); selecting an unprocessed one of the plurality of processing target sub-groups (e.g., queued processing request 205E reflects three unprocessed processing target sub-groups 217A, 217B, and 217C); and releasing the selected unprocessed one (e.g., any one of 217A, 217B, and 217C) of the plurality of processing target sub-groups 217A-C to the multi-tenant database 130. For example, in one embodiment, the logic within the host organization 110 selects the first unprocessed chunk or processing target sub-group 217A-C for release for processing in the multi-tenant database 130. Thus, unprocessed chunk 217A may be selected for release during such an iteration, while unprocessed chunks 217B and 217C are re-queued by re-queuing 205E in the batch processing queue 160.

In one embodiment, the processing request 115 or the corresponding queued processing request (e.g., one of 205A-E) is re-queued in the batch processing queue 160. For example, logic in the host organization re-queues the processing request 115 with the batch processing queue 160 when at least one of the plurality of processing target sub-groups 217A-C for the processing request 115 remain unprocessed. Thus, if processing request 115 corresponds to queued processing request 205E, and chunk or processing target sub-group 217A is released for processing to the multi-tenant database 130, then chunks/processing target sub-groups 217B and 217C would remain as unprocessed. Accordingly, 205E having the unprocessed processing target sub-groups 217B and 217C therein would be re-queued with batch processing queue 160.

In one embodiment, logic of the host organization 110 iteratively repeats the waiting, selecting, and releasing operations until all of the plurality of processing target sub-groups 217A-C for the processing request (e.g., queued processing request 205E corresponding to received processing request 115) are processed in the multi-tenant database 130. Re-queuing may constitute moving the queued processing request (e.g., 205E as discussed or any one of 205A-E) to the bottom position of the batch processing queue 160 when an unprocessed chunk or processing target sub-group from one of the queued processing requests 205A-E are released to the multi-tenant database 130 for processing.

In one embodiment, queuing the processing request (e.g., received processing request 115) with the batch processing queue 160 includes submitting a reference message for the received processing request 115 to the batch processing queue 160. For example, any one of elements 205A-E positioned within the batch processing queue 160 may represent reference messages. Thus, instead of queuing an object having the received processing request 115 embodied therein, including its specified customer logic/processing logic 116 and its specified processing target group 117, a reference message, such as a pointer or other reference handle, is queued with the batch processing queue 160. Then, when the queued reference message (e.g., 205A-E) reaches the top position of the batch processing queue 160, the reference message is resolved to retrieve the specified customer logic/processing logic 116 and the specified processing target group 117 or corresponding plurality of processing sub-groups (e.g., 117A-C from FIG. 1 or unprocessed chunks/processing sub-groups 217A-C of FIG. 2).

In one embodiment, releasing each of the plurality of processing target sub-groups 217A-C for processing in the multi-tenant database 130 includes de-queuing the reference message 205A-E from the batch processing queue (e.g., de-queuing reference message 205E from the batch processing queue). In such an embodiment, logic in the host organization 110 further includes submitting a new reference message (e.g., submitting new reference message 205A to the batch processing queue 160) for the received processing request 115 to the batch processing queue 160 as part of a commit process for the respective processing target sub-group released for processing in the multi-tenant database 130. For example, wherein unprocessed processing target sub-group or chunk 217A is released for processing, as the processing completes and the database transactions are committed to the database, an event is triggered to re-queue or queue a new reference message to handle any remaining unprocessed chunks (e.g., remaining unprocessed processing target sub-groups 217B-C). Thus, in such an embodiment, the new reference message (e.g., 205A) corresponds to a next unprocessed one of the plurality of processing target sub-groups for the processing request when at least one processing target sub-group (e.g., any one of 217A-C) for the received processing request 115 remains in an unprocessed state. For example, a pointer or reference handle to unprocessed chunk/processing target sub-group 217B can be queued, where 217B has not yet been processed and is therefore the next chunk associated with the received processing request 115 that requires processing after 217A. Upon completion of processing for 217B, a new pointer/reference message to 217C is then queued or re-queued, and so forth for all chunks/processing target sub-groups associated with an original processing request 115. Note that queued processing request 205A reflects unprocessed elements 217B and 217C, but element 217A is missing from chunk/processing target sub-group 217A at the bottom of the batch processing queue 160, as element 217A is no longer in an unprocessed state.

In one embodiment, an exit handler 285 handles the re-queuing or the new reference message queuing as processed chunks complete their respective processing. For example, the exit handler 285 may check and determine whether additional chunks/processing target sub-groups remain in an unprocessed state, and thus require further processing and require queuing.

In one embodiment, queuing the received processing request 115 with the batch processing queue 160 includes generating a reference message for the processing request in the batch processing queue. For example, elements 205A-E represent reference messages in accordance with one embodiment, each corresponding to a queued position for a received processing request 115. In such an embodiment, a generated and queued reference message (e.g., one of 205A-E) specifies: the plurality of processing target sub-groups 217A-C, a processing state for each of the plurality of processing target sub-groups, for example, each of 217A-C reflect an unprocessed state, but in such an embodiment, rather than dropping or discarding processed chunks, as is reflected by the re-queued element 205A, the reference message tracks all the chunks/processing target sub-groups 217A-C and reflects a change in their state from unprocessed to complete or processed, or other appropriate state/status. In such an embodiment, a generated and queued reference message 205A-E further specifies a pointer to each of the plurality of processing target sub-groups 217A-C, such that each may be retrieved, and a pointer to the processing logic (e.g., 116 from FIG. 1) to be applied to each of the plurality of processing target sub-groups 217A-C or chunks.

In accordance with such an embodiment, batch processing queue 160 manages a list of pending batch processing requests (e.g., 205A-E corresponding to the queued reference messages) to be asynchronously processed against the multi-tenant database 130, each pending batch processing request 205A-E having one or more processing target sub-groups 217A-C in an unprocessed state. When all processing target sub-groups 217A-C corresponding to a pending and queued batch processing request/reference message 205A-E complete their respective processing in the multi-tenant database 130, there is no need to maintain a queue position as all work is complete, and thus, the queued batch processing requests/reference message 205A-E is de-queued.

In one embodiment, logic in the host organization 110 sends a completion notification 265 to the originator of the processing request. For example, in one embodiment, the exit handler 285 determines that all processing target sub-groups 217A-C corresponding to an originally received processing request 115 have completed processing (e.g., no chunks/processing target sub-groups remain in an unprocessed state) and then, the exit handler 285 responsively triggers a completion notification 265, for example, by generating and sending the completion notification 265 to an originator (e.g., customer organization 105A-C) of the received processing request 115 via the network 125.

In accordance with one embodiment, the completion notification 265 includes a completion report which specifies each of the plurality of processing target sub-groups/chunks 217A-C released for processing in the multi-tenant database 130. In such an embodiment, the completion report further specifies a completion status for each of the plurality of processing target sub-groups/chunks 217A-C, where the completion status indicates a successful or unsuccessful completion for each processing target sub-group 217A-C.

In one embodiment, each completion status specifies a state or status selected from the following group: complete and committed without error; complete and committed after re-try due to excessive use of resources; complete and committed after re-try due to excessive multi-tenant database workload; and abort due to one or more errors for the respective processing target sub-group 217A-C.

When processing chunks/processing target sub-groups 217A-C trigger an error within the respective sub-group, logic in the host organization may trigger a termination event for that respective sub-group, thus preventing a database commit for any of the transactions in the respective sub-group. However, such an abort does not have any affect on other chunks/processing target sub-groups 217A-C associated with a common processing request 115 in accordance with certain embodiments. Thus, some chunks/sub-groups 217A-C may complete successfully, while others may abort.

The re-try messages/status may be triggered when a chunk or processing target sub-group 217A-C is eligible for release and/or released for processing, but prematurely terminated due to, for example, the customer organization associated with the processing request having consumed an excessive amount of resources, and thus, processing for that customer organization must be throttled, or because the multi-tenant database is determined to be over-burdened, and thus, asynchronous workloads are postponed and/or terminated and re-tried later so as to alleviate computational load upon the multi-tenant database 130.

In one embodiment, the batch processing queue 160 releases chunks/processing target sub-groups 217A-C through a governor 295. For example, in one embodiment, releasing each of the plurality of processing target sub-groups 217A-C for processing in the multi-tenant database 130 constitutes releasing the plurality of processing target sub-groups 217A-C for processing subject to one or more release limits enforced by a batch processing governor 295.

In such an embodiment, the one or more release limits are selected from the following group: a maximum amount of memory permissibly allocated to each release of any one processing target sub-group 217A-C or chunk associated with any received processing request 115 from any customer organization 105A-C; a maximum number of database statements permissibly executable with each release; a maximum number of permissible relational database row transactions for each release; a maximum number of permissible non-relational database object transactions for each release; a maximum amount of database heap permissibly allocated or consumed by each release; a maximum total number of aggregate transactions by any one customer organization within a specified time period (e.g., per 24-hour time period, per 60 minute time period, etc.); a maximum total number of aggregate releases for batch processing jobs by any one customer organization within a specified time period; a maximum number of concurrent batch processing jobs releasable to the multi-tenant database (e.g., an arbitrary maximum threshold of concurrent asynchronous jobs, such as five concurrent jobs or any other appropriate number); and a maximum current workload of the multi-tenant database (e.g., if computational load or workload is above a threshold, then the governor 295 postpones/throttles release of asynchronous jobs).

In such an embodiment, a violation of any of the one or more release limits causes the batch processing governor 295 to throttle releases of batch processing jobs (e.g., work corresponding to queued processing requests/reference messages 205A-E) to the multi-tenant database 130. Throttling or slowing, or postponing releases of asynchronous workload permits a maximum amount of available resources to be focused upon higher priority synchronous workload within the multi-tenant database 130.

In accordance with one embodiment, a non-transitory computer readable storage medium has instructions stored thereon. In such an embodiment, the instructions, when executed by a host organization 110 having a processor and memory therein, cause the host organization 110 to perform operations, perform a method, or carry out instructions, for receiving a processing request 115, dividing up work associated with such a processing request 115, and queuing and releasing the work associated with the processing request in parts, by implementing operations and functionality as described in accordance with the various embodiments set forth above.

For example, in one embodiment, instructions stored upon a non-transitory computer readable storage medium causes a host organization 110 to perform operations including receiving a processing request 115 for a multi-tenant database 130, in which the processing request specifies processing logic 116 and a processing target group 117 within the multi-tenant database 130, dividing or chunking the processing target group 117 into a plurality of processing target sub-groups 217A-C, queuing the processing request 115 with a batch processing queue 160 for the multi-tenant database 130 among a plurality of previously queued processing requests, and releasing each of the plurality of processing target sub-groups 217A-C for processing in the multi-tenant database 130 via the processing logic at one or more times specified by the batch processing queue 160.

As noted above, database transactions included in a processing request 115 may include transactions such as a record add, a record retrieval, a record update, a record search, and so forth. In some embodiments, data upon which such transactions rely is located external to the multi-tenant database system 130, and thus, is retrieved from an external source as part of processing such a processing request 115 in the multi-tenant database 130. Thus, in accordance with some embodiments, exogenous data 298 is retrieved, pulled, or accessed by the multi-tenant database 130 in support of executing a processing request 115 or parts/chunks/portions (e.g., processing target sub-groups 217A-C) of a processing request 115 released to the multi-tenant database 130 from the batch processing queue 160. In one embodiment, exogenous data 298 is staged at, for example, file repository 165 within host organization 110. Such exogenous data 298, or other data external to the multi-tenant database 130 which is required in support of a database transaction specified by a processing request 115, may be staged at the file repository 165 by an earlier submission from a customer organization 105A-C. Alternatively, such day may be included with an incoming processing request 115, and staged at file repository 165 for later retrieval. Exogenous data 298 may be specified by logic 116 inclusive to a processing request 115 received by host organization 110, or may be located and retrieved by the execution hardware, software, and logic 120 of the multi-tenant database 130. Notably, exogenous data 298 is not required in fulfillment of all processing requests 115, and thus, is presented as being an optionally retrieved element from the file repository 165.

Figure 3:
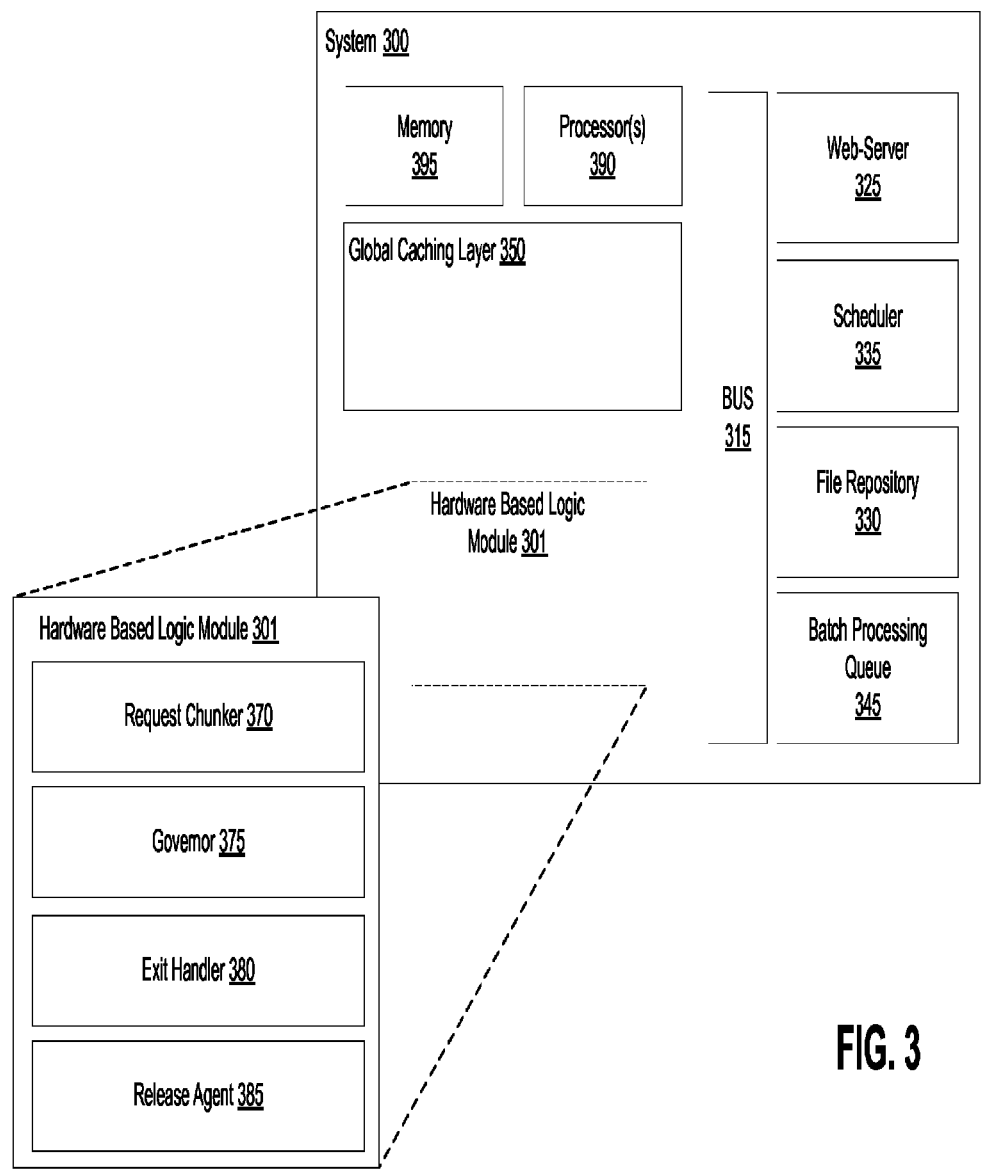
FIG. 3 shows a diagrammatic representation of a system 300 in which embodiments may operate, be installed, integrated, or configured.

FIG. 3 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 among a plurality of peripheral devices communicably interfaced with bus 315. System 300 further includes web-server 325, for example, to receive processing requests, return responses, and otherwise interface with remote clients, such as client devices located within customer organizations 105A-C. Web-server 325 may operate as a request interface to receive processing requests for a multi-tenant database communicably interfaced with the system 300.

System 300 is further depicted as having a scheduler 335 designed to release asynchronous work, jobs, and transactions at a time and/or interval specified by incoming requests, such as requests for customer organizations 105A-C. File repository 330 provides storage as necessary for the system 300, for example, to store customer logic/specified processing logic, and divided processing target sub-groups as necessary. Batch processing queue 345 queues a plurality of processing requests and/or pointers and reference messages corresponding to such processing requests, each awaiting release for processing on behalf of users of the multi-tenant database system. System 300 further includes a global caching layer 350 to provide caching services to communicably interfaced devices and systems and in particular, provide caching of status information and results data (e.g., meta data, etc.) associated with the fulfillment of processing requests received from customer organizations.

Distinct within system 300 is hardware based logic module 301 which includes request chunker 370, governor 375, exit handler 380, and release agent 385. In accordance with one embodiment, request chunker 370 divides/breaks up/chunks processing target groups as specified within received processing requests, for example, creating multiple chunks for asynchronous processing and/or a plurality of processing target sub-groups for asynchronous processing. Governor 375 enforces one or more release limits against chunks and processing target sub-groups released for processing by the batch processing queue 345. Where necessary, governor 375 retrieves calculated current computational loads or retrieves information necessary to calculate and determine a current computational load of the multi-tenant database system, upon which release limits may be based. Exit handler 380 collects results and exit codes and sends completion notifications, generates completion reports, and additionally checks to determine whether additional work remains for received processing requests and re-queues or generates new reference messages for submission to the batch processing queue. Release agent 385 coordinates with batch processing queue 345 to release each of the plurality of processing target sub-groups for processing in the multi-tenant database via the processing logic at one or more times as specified by the batch processing queue.

Figure 4:
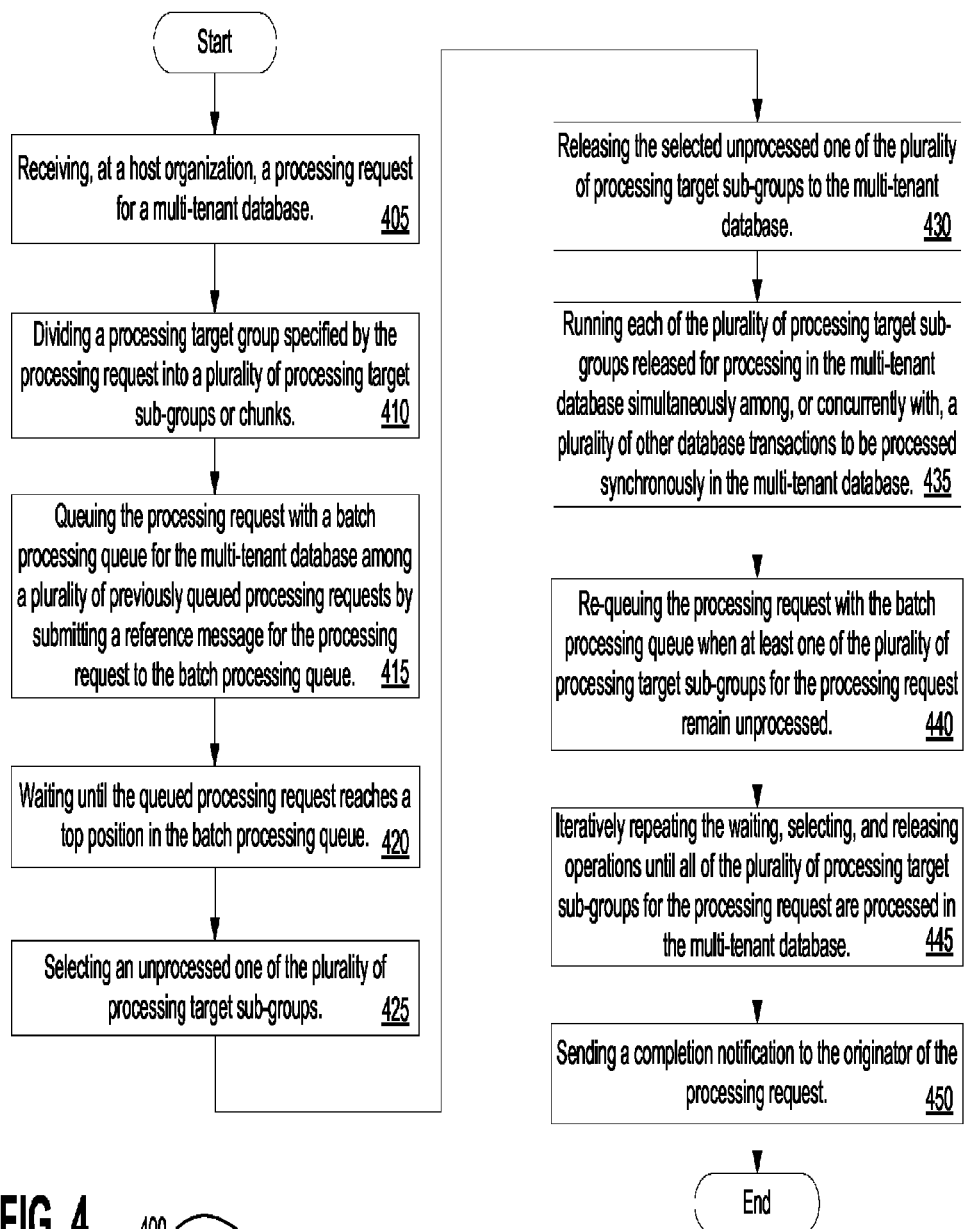
FIG. 4 is a flow diagram illustrating a method for batch processing in an on-demand service environment in accordance with disclosed embodiments.

FIG. 4 is a flow diagram illustrating a method 400 for batch processing in an on-demand service environment in accordance with disclosed embodiments, including receiving processing requests, and coordinating the queuing and release of work associated with such processing requests against a multi-tenant database system. Method 400 may be performed by processing logic that may include hardware (e.g., circuitry, dedicated logic, programmable logic, microcode, etc.), software (e.g., instructions run on a processing device to perform various query operations such receiving, queuing, chunking, releasing, and transacting with a multi-tenant database system, or some combination thereof. In one embodiment, method 400 is performed by hardware logic, such as the hardware based logic module depicted at element 301 of FIG. 3. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic for receiving a processing request for a multi-tenant database at a host organization (block 405). At block 410, processing logic divides a processing target group specified by the processing request into a plurality of processing target sub-groups or chunks.

At block 415, processing logic queues the processing request with a batch processing queue for the multi-tenant database among a plurality of previously queued processing requests by submitting a reference message for the processing request to the batch processing queue. Alternatively, queuing the processing request may include queuing the processing request itself, rather than a reference message or pointer for processing request (e.g., inserting an object corresponding to the reference message onto the queue).

At block 420, processing logic waits until the queued processing request reaches a top position in the batch processing queue and at block 425, processing logic selects an unprocessed one of the plurality of processing target sub-groups.

At block 430, processing logic releases the selected unprocessed one of the plurality of processing target sub-groups to the multi-tenant database, for example, releasing each of the plurality of processing target sub-groups for processing in the multi-tenant database via the processing logic at one or more times specified by the batch processing queue.

At block 435, processing logic runs each of the plurality of processing target sub-groups released for processing in the multi-tenant database simultaneously among or concurrently with a plurality of other database transactions to be processed synchronously in the multi-tenant database.

At block 440, processing logic re-queues the processing request with the batch processing queue when at least one of the plurality of processing target sub-groups for the processing request remain unprocessed.

At block 445, processing logic iteratively repeats the waiting, selecting, and releasing operations until all of the plurality of processing target sub-groups for the processing request are processed in the multi-tenant database.

At block 450, processing logic sends a completion notification to the originator of the processing request. For example, by communicating a message to a client computing device at a host organization which originated the originally received processing request.

Figure 5:
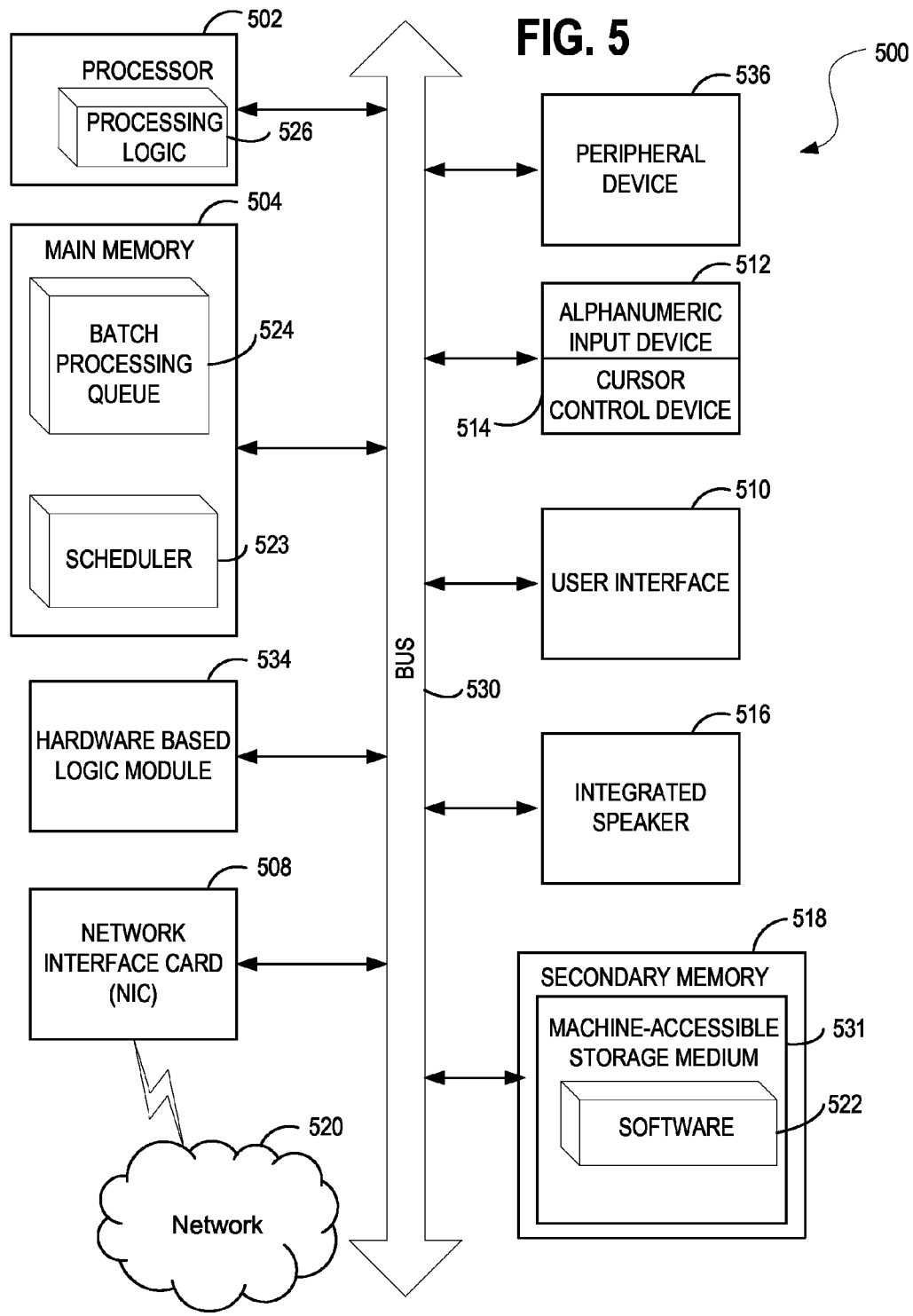
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment, as a blade within a blade server, as a node within a computing grid, or as a physically separate and distinct machine within a machine farm of a datacenter. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a batch processing queue 524 which maintains a list or a queue of pending processing requests received from customer organizations awaiting asynchronous processing via a communicatively interfaced multi-tenant database system. Main memory 504 further includes a scheduler 523 which performs release of asynchronous work at times or intervals as specified by incoming processing requests (e.g., requests which are scheduled rather than queued). Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.). The computer system 500 may further include a Hardware based logic module 534 to performing chunking operations, apply release restrictions, perform exit operations (e.g., re-queue unprocessed chunks/sub-groups and initiate completion notifications), and coordinate release of work from the queue, in accordance with the described embodiments.

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A non-transitory computer readable storage medium having computer instructions stored thereon that are capable of causing a computer to implement operations comprising:
   receiving a first batch request from a user of a database service, wherein the first batch request specifies:
      processing logic including instructions for performing at least one operation; and
      a data group indicative of data stored by the database service that is to be processed using the processing logic;
   dividing the data group into a plurality of data sub-groups;
   queuing the first batch request in a batch processing queue of the database service; and
   when the first batch request in the batch processing queue is to be processed, determining to process a portion of the plurality of data sub-groups using the processing logic and re-queue remaining unprocessed portions of the plurality of data sub-groups behind a second, different batch request in the batch processing queue such that the remaining unprocessed portions are to be processed using the processing logic after processing at least a portion of the second, different batch request.

2. The non-transitory computer readable storage medium of claim 1, wherein the processing logic comprises customer logic to be applied to the data group in the database service; and wherein the customer logic is applied to each of the plurality of data sub-groups in the database service when processed.

3. The non-transitory computer readable storage medium of claim 1, further comprising: sending a completion notification to an originator of the first batch request.

4. The non-transitory computer readable storage medium of claim 3, wherein the completion notification comprises a completion report specifying: each of the plurality of data sub-groups processed in the database service; and a completion status for each of the plurality of data sub-groups indicating a successful or unsuccessful completion for each data sub-group.

5. The non-transitory computer readable storage medium of claim 1, wherein the first batch request is received at a host organization having the database service operating therein; and wherein the first batch request is one of a plurality of requests received from a plurality of users associated with customer organizations, wherein each customer organization is one of: a separate and distinct remote organization, an organizational group within the host organization, a business partner of the host organization, or a customer organization that subscribes to cloud computing services provided by the host organization.

6. The non-transitory computer readable storage medium of claim 1, wherein the data group specified by the first batch request comprises at least one of a plurality of rows within one or more tables of a relational data store in the database service and a plurality of objects in a non-relational data store in the database service.

7. The non-transitory computer readable storage medium of claim 1, wherein the database service comprises elements of hardware and software that are shared by a plurality of separate and distinct customer organizations, each of the separate and distinct customer organizations being remotely located from a host organization having the database service operating therein; and wherein the data group specified by the first batch request comprises at least one of a plurality of rows within one or more tables of a relational data store in the database service and a plurality of objects in a non-relational data store in the database service.

8. The non-transitory computer readable storage medium of claim 1, wherein dividing the data group into a plurality of data sub-groups is based on a size threshold.

9. The non-transitory computer readable storage medium of claim 1, wherein processing the portion of the plurality of data sub-groups using the processing logic comprises concurrently processing a set of the portion of the plurality of data sub-groups.

10. The non-transitory computer readable storage medium of claim 1, wherein the operations further comprise performing synchronous transaction requests for the database service.

11. The non-transitory computer readable storage medium of claim 1, wherein the determination is based on one or more release limits not being violated, wherein the one or more release limits specify constraints on usage of system resources.

12. The non-transitory computer readable storage medium of claim 11, wherein the operations further comprise throttling releases of batch processing jobs responsive to a violation of one of the one or more release limits.

13. The non-transitory computer readable storage medium of claim 1, further comprising terminating processing of a given one of the portion of the plurality of data sub-groups responsive to an error in processing the given one of the portion of the plurality of data sub-groups.

14. The non-transitory computer readable storage medium of claim 1, wherein the operations further comprise:
   when a third batch request in the batch processing queue is to be processed, determining to process each of a plurality of data sub-groups of the third batch request using the processing logic.

15. A system comprising:
   one or more processors; and
   a memory having program instructions stored thereon that are executable by the one or more processors to perform operations comprising:
   receiving a first batch request from a customer of a database service, wherein the first batch request specifies:
      processing logic including instructions for performing at least one operation; and
      a data group indicative of data within the database service that is to be processed using the processing logic;
   dividing the data group into a plurality of data sub-groups;
   queuing a first indication of the plurality of data sub-groups in a batch processing queue of the database service; and
   when the first indication in the batch processing queue is to be processed, determining to process a portion of the plurality of data sub-groups using the processing logic and queue, in the batch processing queue, a second indication of remaining unprocessed portions of the plurality of data sub-groups such that the remaining unprocessed portions are to be processed using the processing logic after processing at least a portion of data sub-groups associated with a second batch request.

16. A method comprising:
   receiving a first batch request from a user of a database service, wherein the first batch request specifies:
      processing logic including instructions for performing at least one operation; and
      a data group indicative of data stored by the database service that is to be processed using the processing logic;
   dividing the data group into a plurality of data sub-groups;

queuing a first indication of the plurality of data sub-groups in a batch processing queue of the database service; and when the first indication in the batch processing queue is to be processed, making a determination to process a portion of the plurality of data sub-groups using the processing logic and re-queue the first indication in the batch processing queue such that remaining unprocessed portions of the plurality of data sub-groups are to be processed using the processing logic after processing at least a portion of data sub-groups associated with a second batch request.

17. The method of claim 16, further comprising retrieving current computational loading of the database service to determine whether to release data sub-groups for processing.

18. The method of claim 16, wherein the first indication specifies, for a given one of the plurality of data sub-groups, a state indicating whether that data sub-group has been processed using the processing logic.

19. The method of claim 16, wherein a number of data sub-groups within the processed portion is based on a maximum number of data sub-groups that are allowed to be processed within a particular interval of time.

20. The method of claim 16, wherein the second batch request is received from a different user of the database service.

* * * * *